(12) United States Patent
Head

(10) Patent No.: US 6,323,420 B1
(45) Date of Patent: Nov. 27, 2001

(54) SUB SEA AND SUB SURFACE TUBING AND CONDUCTORS

(76) Inventor: Philip Head, 178 Brent Crescent, London, NW10 7XR (GB)

(*) Notice: Subject to any disclaimer, the term of this patent is extended or adjusted under 35 U.S.C. 154(b) by 0 days.

(21) Appl. No.: 09/468,597

(22) Filed: Dec. 21, 1999

(30) Foreign Application Priority Data

Dec. 22, 1998 (GB) .................................................. 9828178
May 21, 1999 (GB) .................................................. 9911966
Aug. 19, 1999 (GB) .................................................. 9919695

(51) Int. Cl.$^7$ .................................................. F16L 11/12
(52) U.S. Cl. .................. 174/47; 174/102 R; 138/103; 405/158
(58) Field of Search .................. 174/47, 102 R, 174/106 R; 138/103, 108, 110, 111; 405/158

(56) References Cited

U.S. PATENT DOCUMENTS

| | | | |
|---|---|---|---|
| 3,750,058 | * 7/1973 | Bankert et al. | 138/108 |
| 4,332,509 | * 6/1982 | Reynard et al. | 405/168 |
| 4,411,168 | * 10/1983 | Yoshifuji | 74/501 R |
| 4,570,678 | 2/1986 | Ziemek et al. | |
| 4,767,890 | * 8/1988 | Magnan | 174/28 |
| 5,269,377 | * 12/1993 | Martin | 166/385 |
| 5,362,921 | * 11/1994 | Birkelund et al. | 174/47 |
| 6,062,265 | * 5/2000 | Head | 138/111 |
| 6,078,010 | * 6/2000 | Funahashi et al. | 174/126.1 |

FOREIGN PATENT DOCUMENTS

| | | |
|---|---|---|
| 1 274 285 | 7/1968 | (GB) . |
| 1265194 | 8/1968 | (GB) . |
| 2 057 779 A | 4/1981 | (GB) . |
| 2 066 408 A | 7/1981 | (GB) . |
| 2 085 237 A | 4/1982 | (GB) . |

OTHER PUBLICATIONS

Analysis of Prior Art Against UK Patent Application No. 9930091.5, Publication No. 2345199, XLT43, Mar. 8, 2000 No Date.

* cited by examiner

Primary Examiner—Dean A. Reichard
Assistant Examiner—Adolfo Nino
(74) Attorney, Agent, or Firm—Herbert Dubno

(57) ABSTRACT

A coiled tubing system includes a length of coiled tubing, a cable and an inner tube. The inner tube and the cable are installed in the coiled tubing, and then either the coiled tubing or the inner tube or both are deformed along most of the length of the system so that the cable is secured between the inner surface of the coiled tubing and the outer surface of the inner tube. The coiled tubing and the inner tube may be coaxial, with the cable situated in the annulus between the coiled tubing and the inner tube. The deformation may be produced by a swaging die introduced into the inner tube, the application of a high pressure fluid or gas, crimping the outer surface of the coiled tubing, or using an inner tube reversibly deformable through the application of tension. Similarly, a conducting member may be secured in a system with a length of coiled tubing and an inner tube. Also, a cable or a conducting member may be installed upon an inner tube which may then be removed.

6 Claims, 19 Drawing Sheets

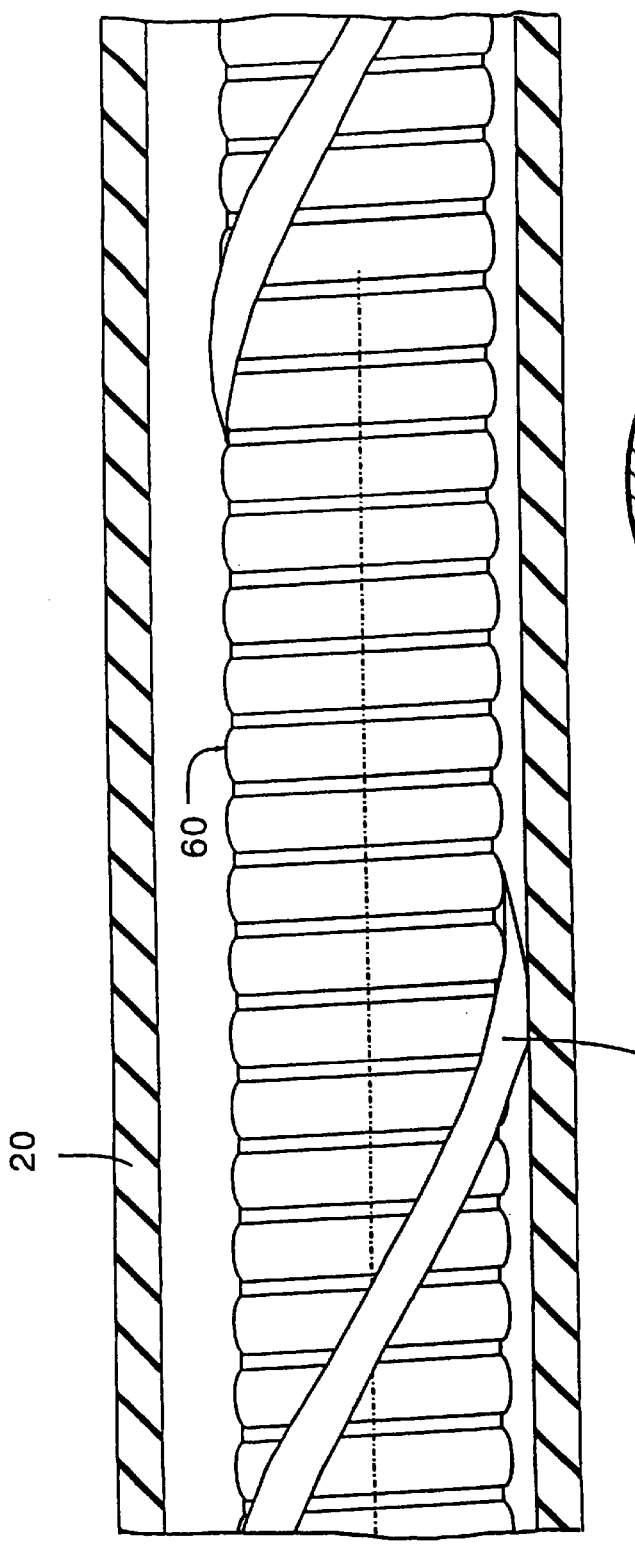
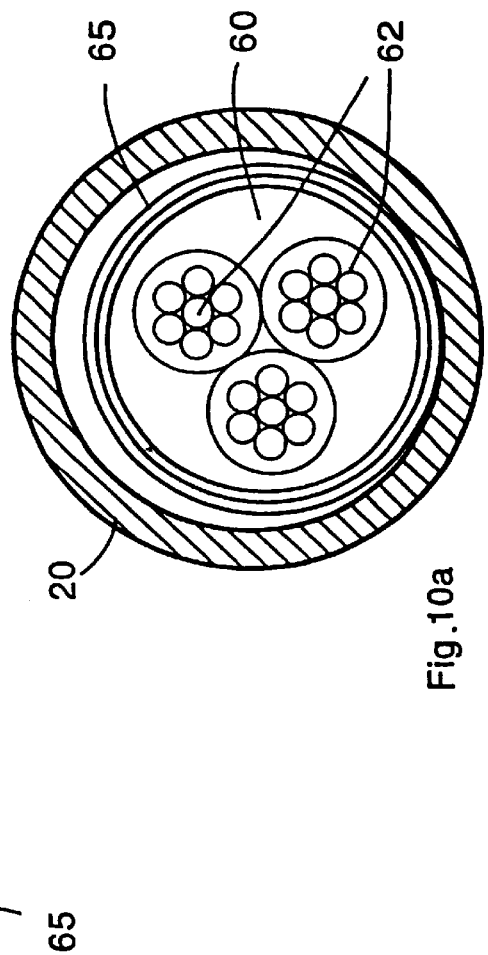
Fig.10
Fig.10a

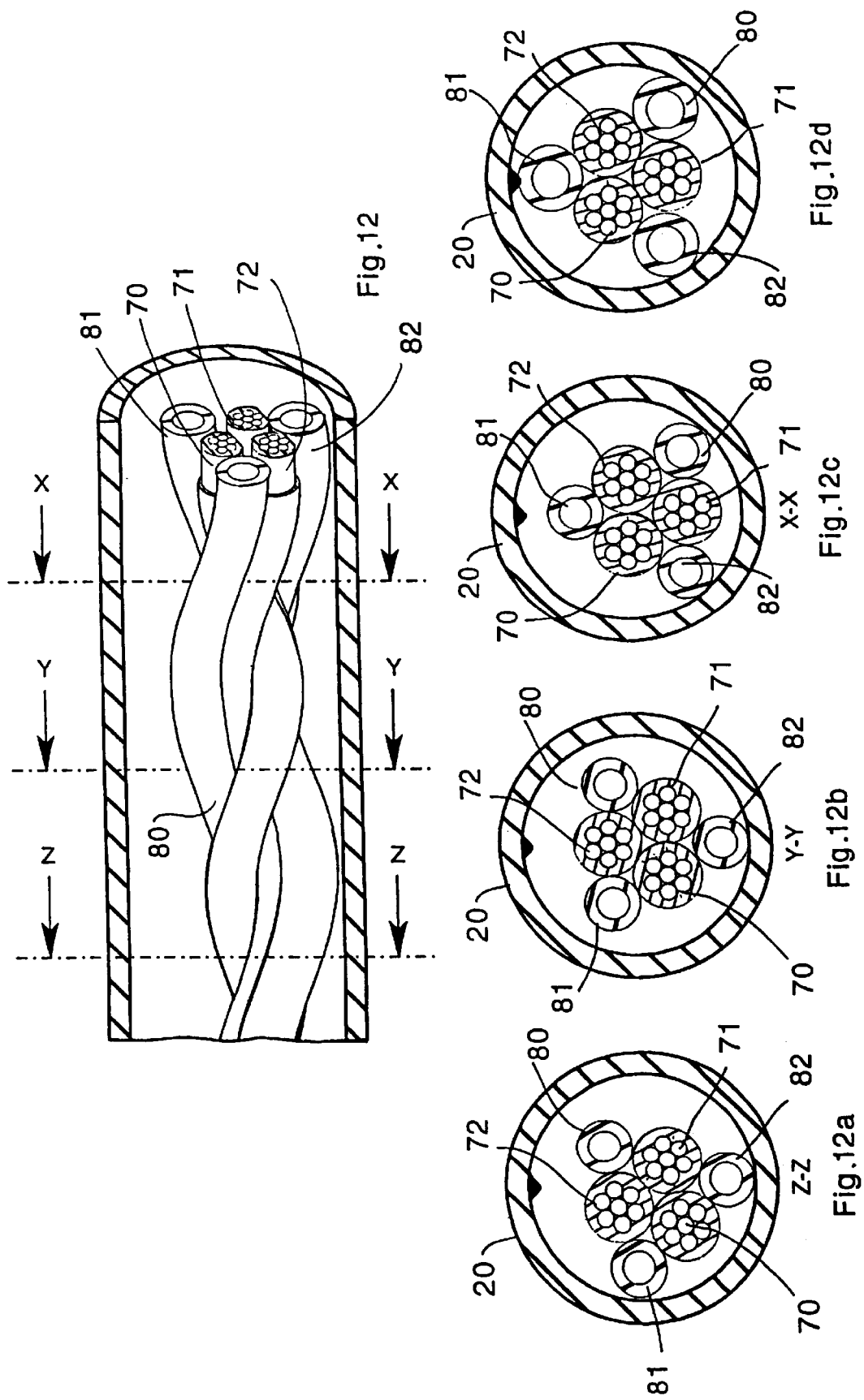

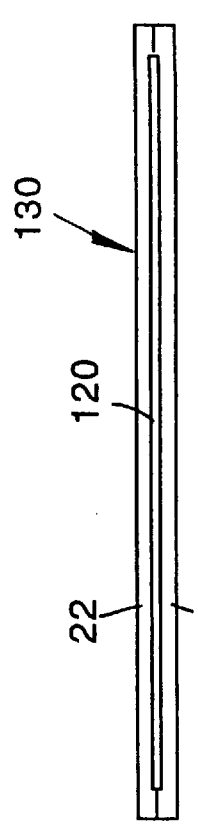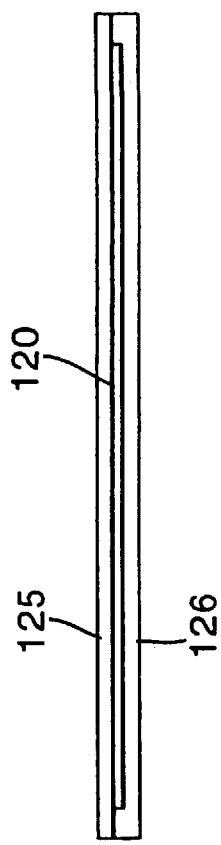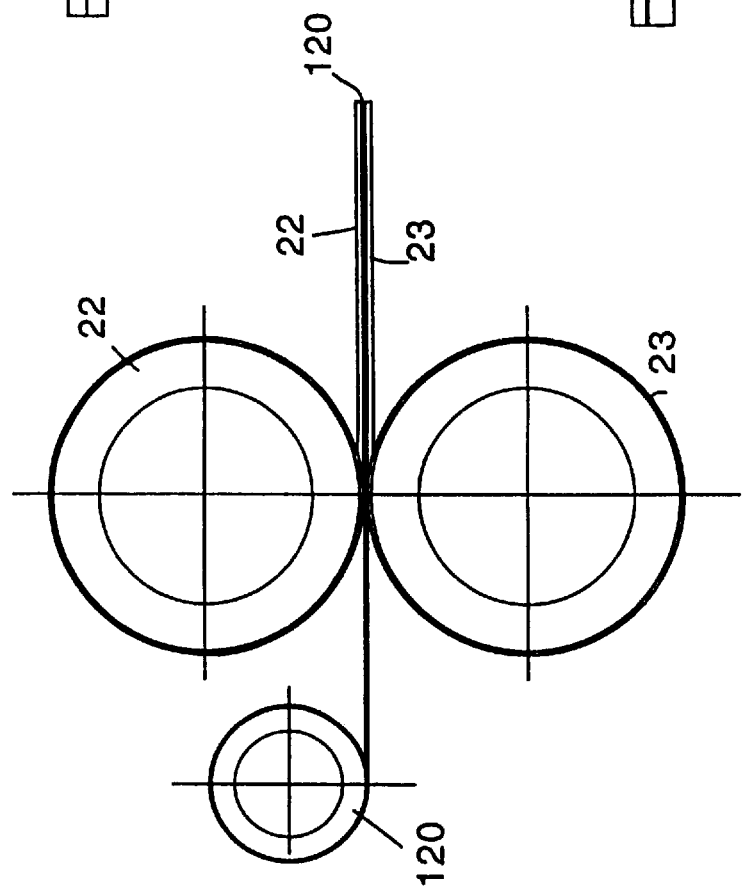

SUB SEA AND SUB SURFACE TUBING AND CONDUCTORS

FIELD OF THE INVENTION

The present invention relates to a method of and an apparatus for providing cabling or an electrically conductive path in tubing, particularly, though not exclusively, in a sub sea or subsurface environment.

BACKGROUND OF THE INVENTION

A simple conventional conducting cable comprises a length of conductive material having a circular cross section, or several such conductors wound or plaited together, the conductor or conductors being wrapped in a insulating sheath. In locations such as the surface of the sea bed, and the borehole of an oil well, several insulating layers and armored layers may be included.

When it is desired to supply power or to carry data from the bottom of a borehole, the conducting cable may either be strapped to the outside of the drillpipe or coiled tubing, or attached to the inside. Attaching the cable to the inside of a drill string or a length of coiled tubing is difficult, as in most methods some form of joining has to take place. This is especially difficult in the case of coiled tubing, as it is difficult to access the joining points over the entire continuous long length of the tube. Known techniques include remotely activatable securement devices attached at intervals along the cable.

It is comparatively simple to strap the conductive cable to the outside of the drill string or tubing, since the outside is freely accessible, but the cable is then prone to damage due to the harsh environment, and the mechanical wear produced by the movement of the drill string through the borehole.

Similar problems occur when including a conductive cable while laying pipelines upon the surface of the sea bed.

OBJECT OF THE INVENTION

The object of the present invention is to provide a method of and an apparatus for providing a conductor which alleviates these problems, supplying a free flowing path and also being convenient to produce.

SUMMARY OF THE INVENTION

According to the present invention there is provided a coiled tubing system including a length of coiled tubing, a cable or conducting member and an inner tube, the inner tube and the cable or conducting member being disposed in the coiled tubing, the coiled tubing and/or the inner tube having been deformed along at least part of their length such that the cable or conducting member is substantially secured between the inner surface of coiled tubing and the outer surface of the inner tube.

The use of the words "coiled tubing" and "coiled tube" refers to the semiflexible continuous tubes used for oil production and similar functions and usually stowed upon a reel, whether or not the tube is actually coiled at a particular time.

The use of the term "cable" is intended to encompass not only electrical cables, but also fiber optic cables, structural cables, and even hollow cables such as hydraulic cable and the like.

Such a tubing and conductor may be used in a downhole environment, or across the surface of the sea bed, for oil production. It may also be used to support the drill bit, or supply well intervention tools, from a floating rig or vessel. It may also be used to transport oil overland. It may of course be used in any situation where coiled tubing is used presently.

BRIEF DESCRIPTION OF THE DRAWING

A sub sea and subsurface conducting apparatus and method of manufacture will now be described as an example and without limitation with reference to the drawing of which:

FIG. 10 shows a partly sectional side view of a further embodiment of the system;

FIG. 10a shows a cross sectional view of this embodiment;

FIG. 12 shows a partly sectional side view of a further embodiment of the system;

FIGS. 12a–12d show cross sectional views of this embodiment before and after installation;

FIG. 15 shows a schematic diagram of production of the conducting member;

FIG. 16 is a cross sectional view of the conducting member before application to the inner coiled tube;

FIG. 17 is a cross sectional view of another embodiment of the conducting member before application to the inner coiled tube;

DESCRIPTION OF THE PREFERRED EMBODIMENTS

Figure 1:
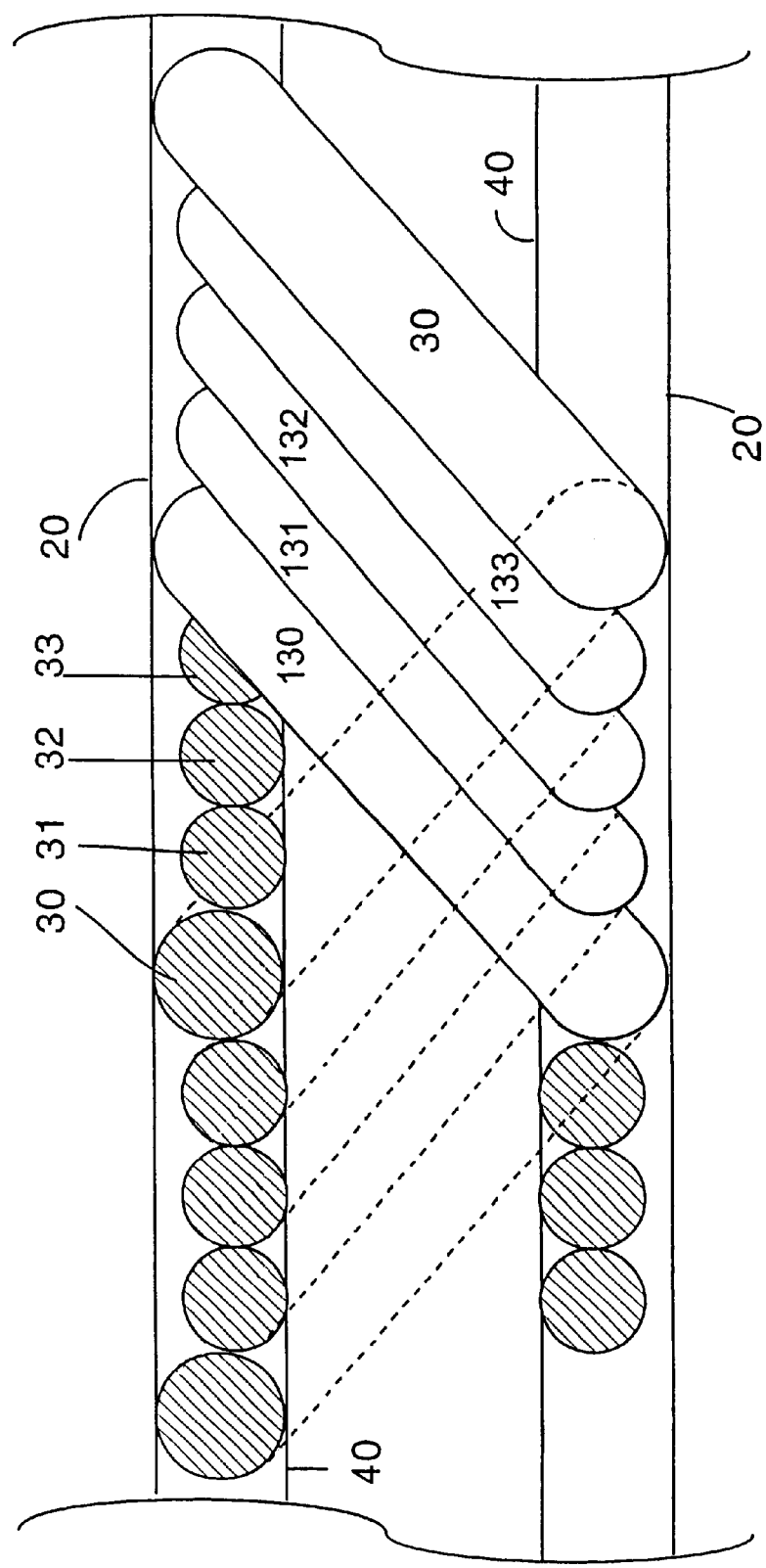
FIG. 1 shows a partly sectional view of a coiled tubing and cable system.

FIG. 1 shows an arrangement of cables within a length of coiled tubing. A length of carrier tube 40 has wound upon it eight cables 30, 31, 32, 33, 130, 131, 132, 133. The cables are helically wrapped in a tightly packed arrangement, that is they generally abut one another along the whole of their lengths, but they are all wound directly against the carrier tube 40 and do not overlap. This winding is achieved by attaching the ends of the cables 30, 31, 32, 33, 130, 131, 132, 133 to the end of the carrier tube, the cables being coiled upon one or more drums to one side of the end of the carrier tube, and the carrier tube then being rotated so as to wind the cables upon it and moved axially so as to achieve the necessary pitch of the helices.

The eight cables wound upon the carrier tube comprise six power cables 31, 32, 33, 131, 132, 133 and two structural cables 30, 130. The structural cables have a larger diameter than the power cables, and are made from a tough material such as steel, the power cables being made from insulated copper. Of all the cables, only the structural cables are in contact with the inner surface of the coiled tubing. In this manner, the structural cables protect the power cables from the friction generated as the cables being pulled into the coiled tubing, and also from rough handling of the coiled tubing when in use.

When this helical winding has been achieved over the whole length of the carrier tube, the carrier tube is introduced into the coiled tubing. This may be done by threading a cord through the coiled tubing, the end of the cord being attached to the carrier tube. When the cord has been fed through the entire length of the coiled tubing, it is pulled so that the carrier tube is dragged through the coiled tubing. This action may be assisted by a forcing mechanism at the end of the coiled tubing at which the carrier tube enters, which pushes the carrier tube in.

The carrier tube may now be secured at each end of the coiled tubing. The arrangement is in any case kept in position by the friction between the carrier tube, the cables and the coiled tubing. Force sufficient to pull the carrier tube and cables through the coiled tubing causes a slight contraction of the carrier tube and/or slight dilation of the coiled tubing sufficient for the carrier tube and cables to pass through the coiled tubing. When the carrier tube is brought to rest, the coiled tubing and/or the carrier tube relax to their original diameters, securing the cables.

The coiled tubing is now ready for use. When the coiled tubing is coiled, the cables' helical form allows the cables to move apart somewhat at the outer circumference of the circular shape formed by the coil tubing. The cables are able to do this because of the slack present in the helical shape. In this way, less strain is put of the cables during the reeling and unreeling of the coiled tubing.

Rather than a carrier tube, a rod may instead be used. The rod could be of a tough material such as steel or braided cable and can contribute to the structural strength of the coiled tubing.

Figure 2:
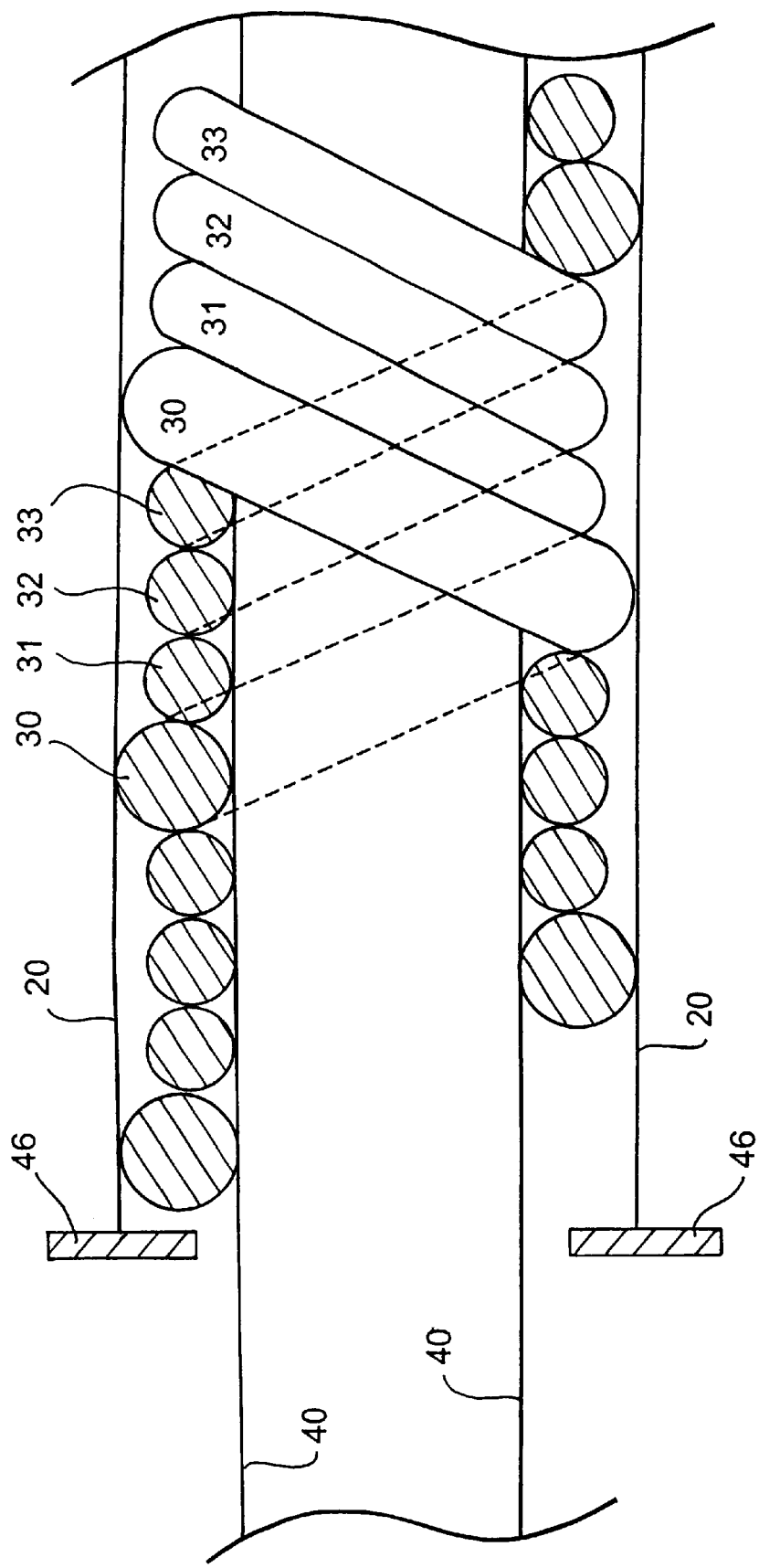
FIG. 2 shows a partly sectional view of another system.

Coiled tubing, being hollow, is often used to transfer materials up and down the well shaft. The presence of the carrier tube in the coiled tubing and cable arrangement necessarily reduces the bore available for such material transfer while this is not possible at all when a rod is used. The carrier tube or rod may therefore be removed from the coiled tubing, leaving the cables inside the coiled tubing still in a helical arrangement. Referring to FIG. 2, when the carrier tube 40 is being pulled through the coiled tubing 20, an annular stop 46 is secured at the end of the coiled tubing opposite the end through which the carrier tube enters. This annular stop 46 has a hole of larger diameter than the carrier tube 40, and allows this to be pulled clear of the coiled tubing, but the hole has an insufficient diameter to allow the cables 30,31,32,33 to pass through it in a similar manner. Instead, they are retained in the coiled tubing. The cables remain in their helical form and the coiled tubing is ready for use, with an increased bore for use as a flow path.

The cables are maintained in their helical form by a number of factors. They may be packed in the coiled tubing sufficiently tightly for them to be helically locked, that is, the outward force produced by the coiling of the cables cause a sufficient frictional force against the inner surface of the coiled tubing to lock the cables in position. When a single structural cable is used with smaller diameter cables, only the structural cable will contribute any helical locking, since only it is in contact with the coiled tubing. The outward force of a particular cable depends, among other things, upon the pitch angle of the helix. The minimum pitch angle in this case is determined by the diameter of the coiled tubing and the diameter of the cables. The characteristics of the cables must be selected bearing these constraints in mind to achieve helical locking.

Figure 3:
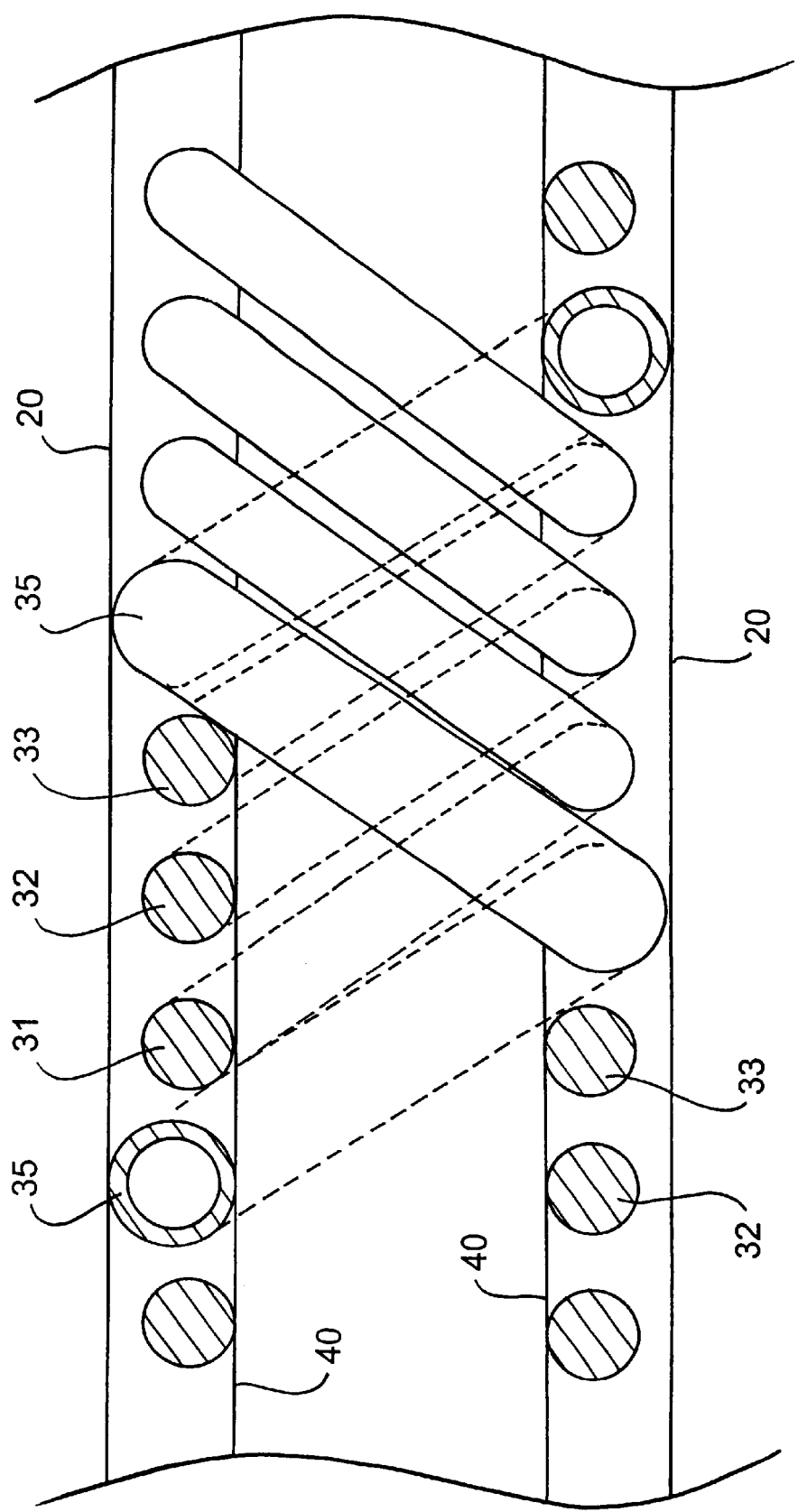
FIG. 3 shows a partly sectional view of a further section.

Referring to FIG. 3, the cables 31,32,33,34,35 could be wound at such a pitch that they are more loosely packed, that is, the cables do not abut against each other. This will diminish the length of cable necessary for a given length of coiled tubing, but the helix may be less self supporting in nature. In the embodiment shown here, a hydraulic conduit 35, made from some tough material such as a suitable composite, also functions as a structural helix.

Alternatively, different cables could also be wound so that they overlap each other.

Figure 4:
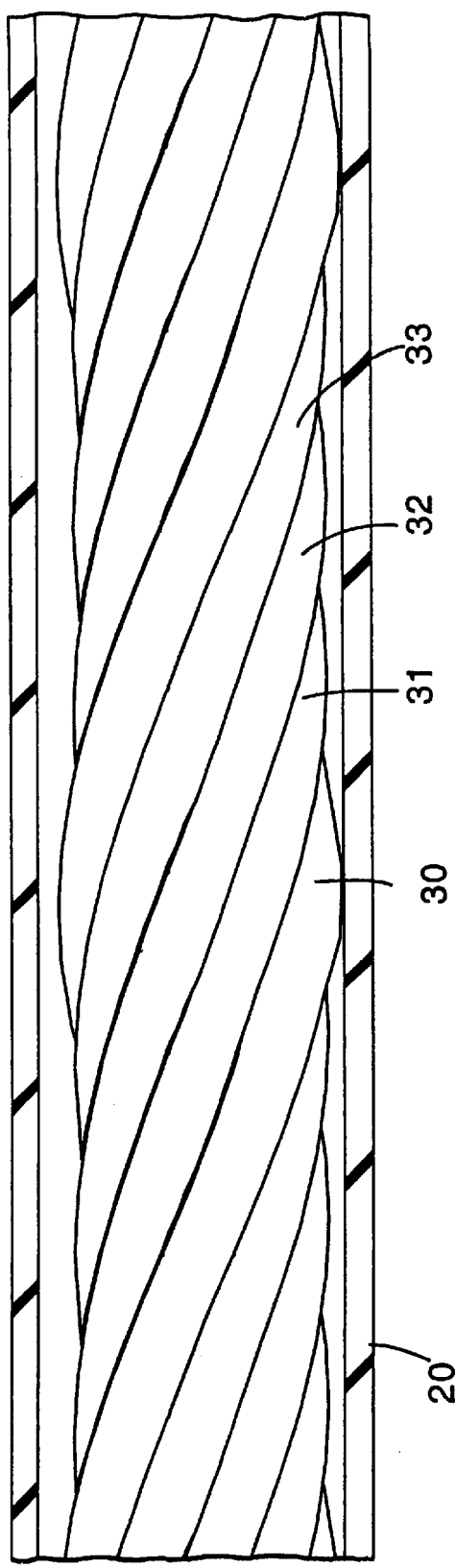
FIG. 4 shows a partly sectional side view of an embodiment of the system.

FIG. 4 shows another arrangement of cables within a length of coiled tubing 20. A length of carrier tube (here not visible) has wound upon it four cables 30,31,32,33. The cables are helically wrapped in a tightly packed arrangement, that is they generally abut one another along the whole of their length, but they are all wound directly against the carrier tube and do not overlap. As in the above embodiments, the ends of the cables 30,31,32,33 may be attached to the end of the carrier tube, the cables being coiled upon one or more drums to one side of the end of the carrier tube, and the carrier tube then being rotated so as to wind the cables upon it and moved axially so as to achieve the necessary pitch of the helices. This is discussed more fully below, with reference to FIG. 13.

As in a previous embodiment, the four cables wound upon the carrier tube comprise three power cables 31,32,33 and a structural cable 30. The structural cable has a larger diameter than the power cables, and is made from a tough material such as steel, the power cables being made from insulated copper. The largest total diameter of the cables and the carrier tube is less than the internal diameter of the coiled tubing. The carrier tube too is made of steel.

When this helical winding has been achieved over the whole length of the carrier tube, the carrier tube is introduced into the coiled tubing 20, by threading a cord through the coiled tubing, the end of the cord being attached to the carrier tube. When the cord has been fed through the entire length of the coiled tubing, it is pulled upon so that the carrier tube is dragged through the coiled tubing. This action may be assisted by a forcing mechanism at the end of the coiled tubing at which the carrier tube enters, which pushes upon the carrier tube. Alternatively, the carrier tube and cables may be injected into the coiled tubing. The protection afforded to the power cables by the structural cable may be augmented with some type of outer covering.

Figure 5:
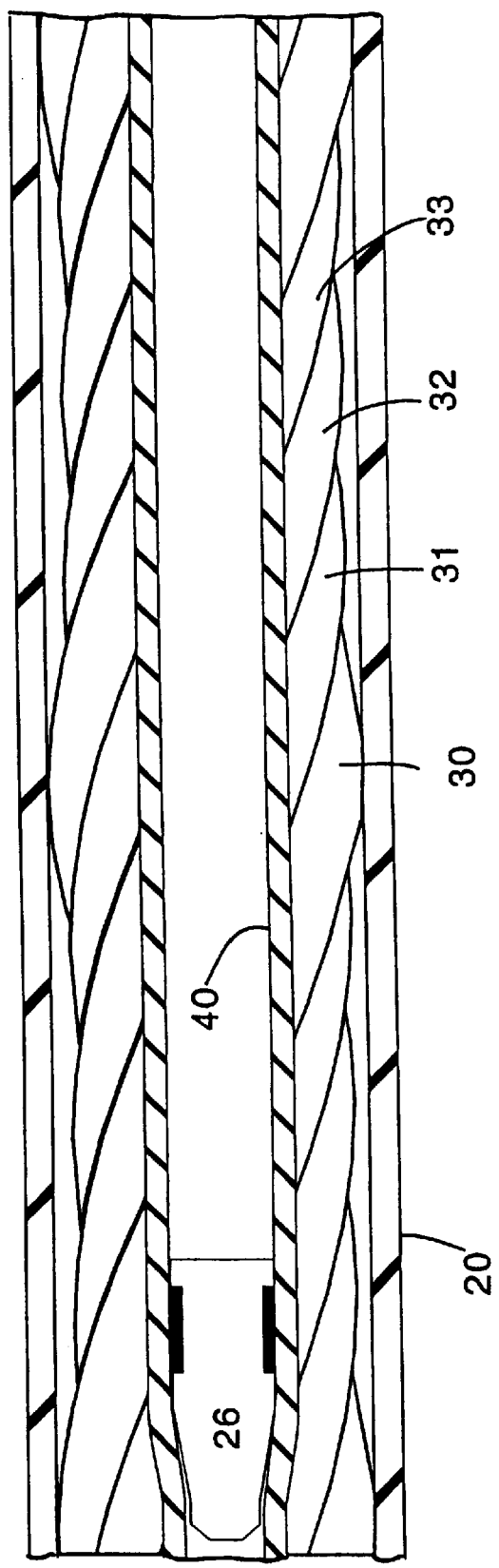
FIG. 5 shows a sectional side view of the system during installation.

Referring to FIG. 5, when the carrier tube 40 is in place, the nose of a swaging die 26 is introduced into the bore of the carrier tube 40. The swaging die 26 has a diameter, at its largest, which is larger than the inner bore of carrier tube 40. The swaging die is attached to a rope (not shown here) which is threaded through the carrier tube prior to the introduction of the swaging die. The swaging die 26 is then pulled through the carrier tube 40, causing the tube 40 to plastically deform, increasing in diameter. The die may also be hydraulically displaced along the carrier tube 40.

The diameter of the swaging die 26 is such that, after swaging, the largest total diameter of the cables and the carrier tube is equal to the internal diameter of the coiled tubing. Moreover, the increase in the diameter of the carrier tube should be such that the carrier tube and cables are held in a radially compressed state by the coiled tubing, that is, the largest total diameter of the carrier tube and cables in the absence of the coiled tubing would be larger than the inner diameter of the coiled tubing. The power cables 31, 32, 33 having a smaller diameter than the structural cable 30, are held away from the inner surface of the coiled tubing 20, and so are protected from damage.

When the coiled tubing 20 is coiled, the cables' helical form allows the cables to move apart somewhat at the outer circumference of the circular shape formed by the coiled tubing. The cables are able to do this because of the slack present in the helical shape. In this way, less strain is put on the cables during the reeling and unreeling of the coiled tubing. The resilience of the structural cable also resists movement of the carrier tube and power cables relative to the coiled tubing, securing the cables within the coiled tubing and reducing the load upon them.

Figure 6:
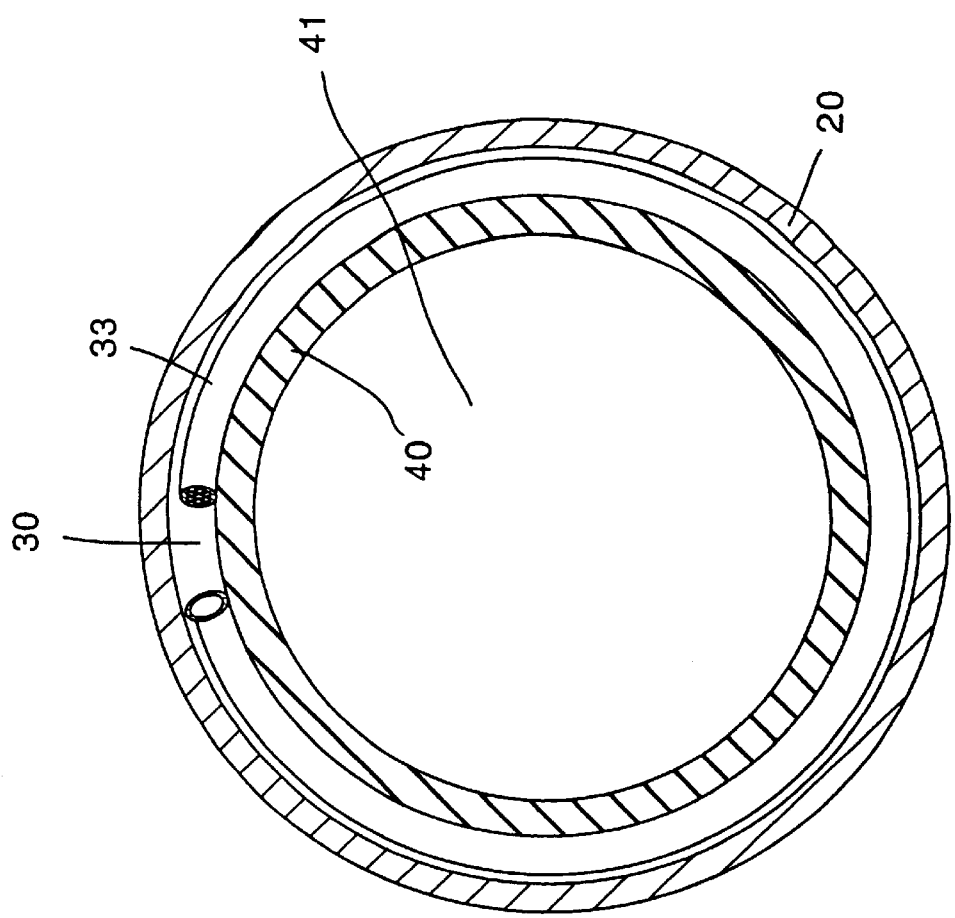
FIG. 6 shows a cross sectional view of the system.

FIG. 6 shows a cross section of the system. The structural cable 30 which in this embodiment is also a hydraulic cable, is in a compressed state between the inside surface of the coiled tubing 20 and the outside surface of the carrier tube 40. The power cables (only 33 here visible) are not compressed or in contact with the inside surface of the coiled tubing.

Coiled tubing, being hollow, is often used to transfer materials up and down the well shaft. Though the available bore is reduced, materials may still be transported through the carrier tube 40, and instruments such as logging instruments may still be introduced to the bore. The power cables 31,32,33 are also protected from the material flow, so need not be so heavily mechanically protected.

Figure 7:
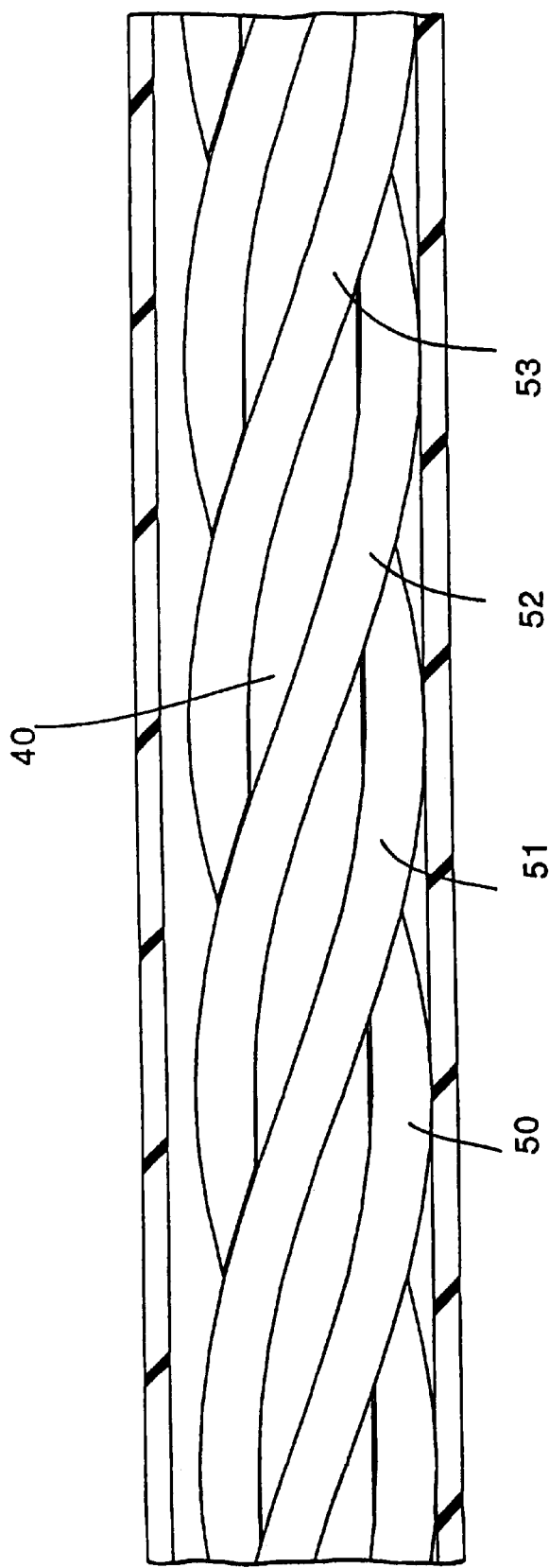
FIG. 7 shows a partly sectional side view of another embodiment of the system.
Figure 8:
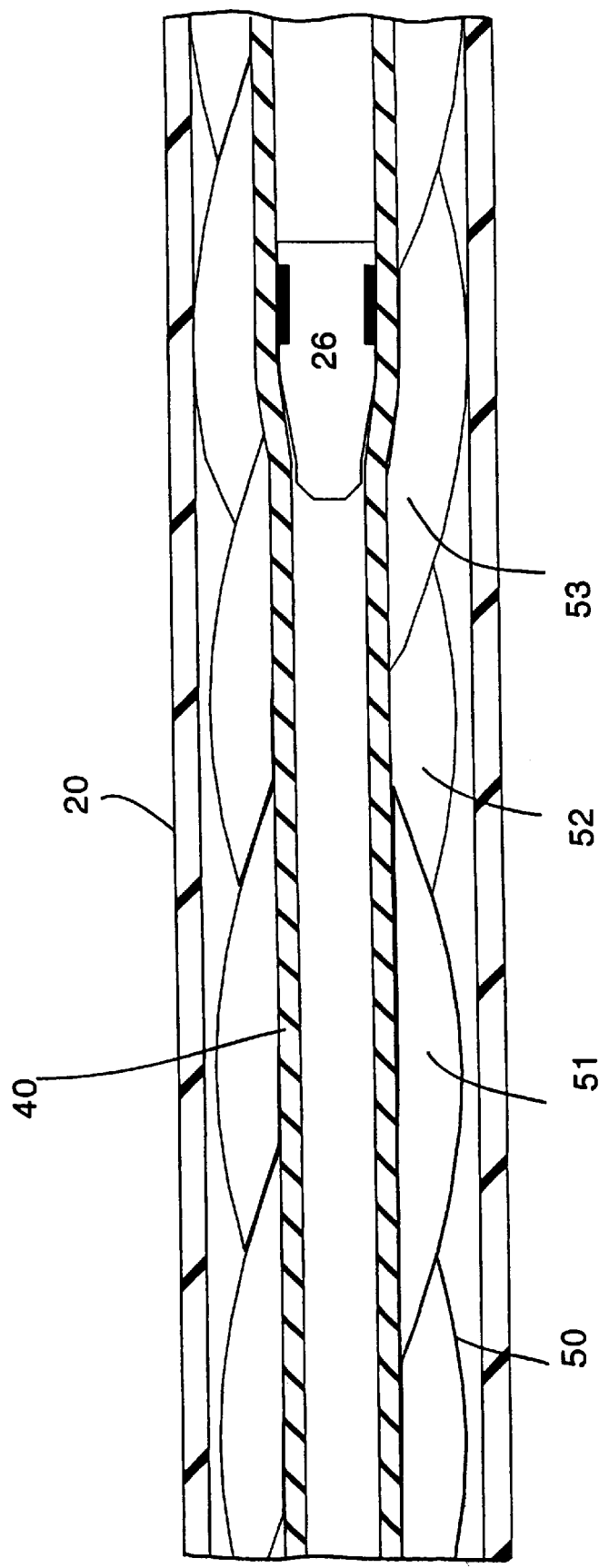
FIG. 8 shows a sectional side view of this embodiment during installation.

If the power cables are sufficiently strong, then the structural cables are not needed. This arrangement is shown in FIG. 7. The four power cables 50,51,52,53 here are wound at greater pitch so as to be loosely packed, that is, the similarly pitched helices of the four cables do not touch. This will diminish the length of cable necessary for a given length of coiled tubing. As the carrier tube 40 is swaged, as shown in FIG. 8, the power cables find themselves pressed against the inside of the coiled tubing 20, securing themselves against movement relative to the coiled tubing.

Rather than being swaged, the carrier tube could have its diameter increased in other ways, such as the application of high pressure to its inner volume, causing the carrier tube to bulge outwards and so secure the cables relative to the coiled tubing.

Figure 9:
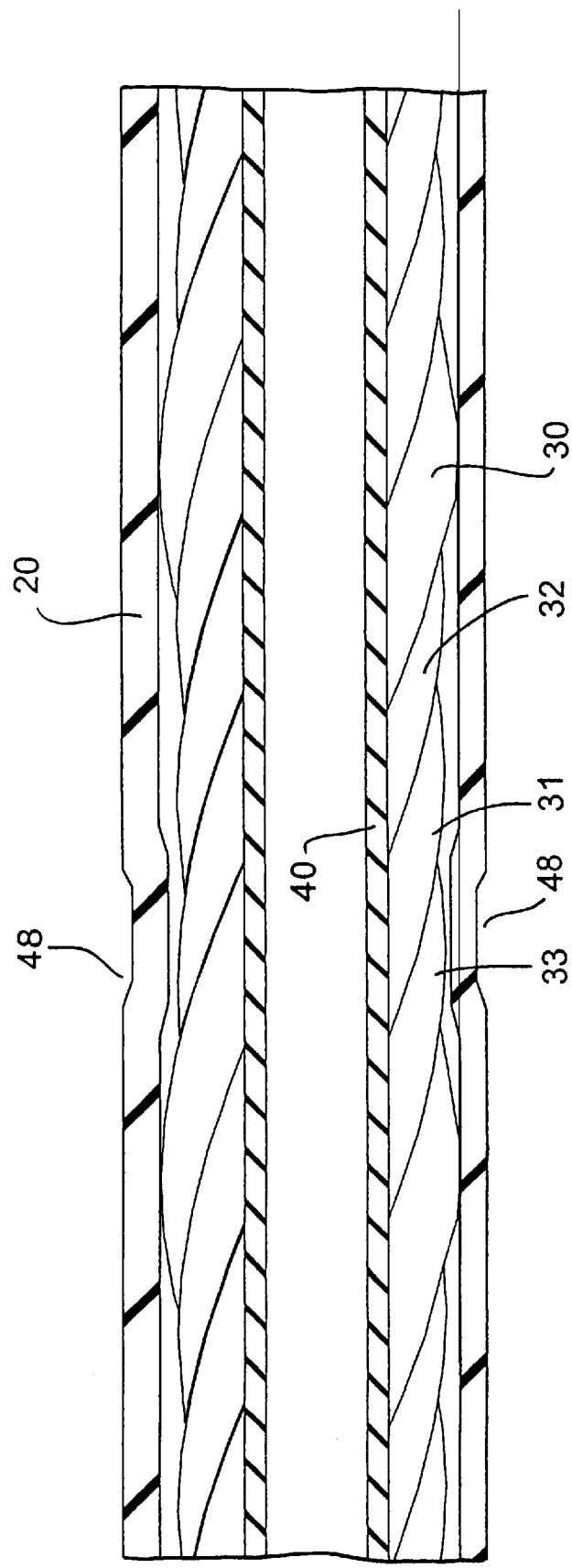
FIG. 9 shows a sectional side view of a modification of the system.

Referring to FIG. 9, in a further embodiment the power cables 31, 32, 33 structural cable 30, and carrier tube 40 are introduced to the coiled tubing 20, and the carrier tube is swaged as before. The coiled tubing is then inwardly crimped at intervals along the coiled tubing to form regions 48 of coiled tubing 20 having a smaller diameter. The structural cable 30 is further inhibited from movement relative to the coiled tubing, as the cable catches upon the crimped regions 48.

Referring to FIG. 10, a solid power cable 60 has an expandable tube 65 wrapped around it. In its unexpanded state the tube 65 lies somewhat flatly against the power cable 60, and the total diameter of the power cable and expandable tube does not exceed the internal diameter of the coiled tubing 20. The power cable 60 and tube 65 are introduced into the coiled tubing 20.

FIG. 10a illustrates that the power cable 60 may include arrangements of cables 62 within it, and also shows the difference in diameter between the inside of the coiled tubing 20 and the outside of the expandable tubing 65 while its unexpanded state.

Figure 11:
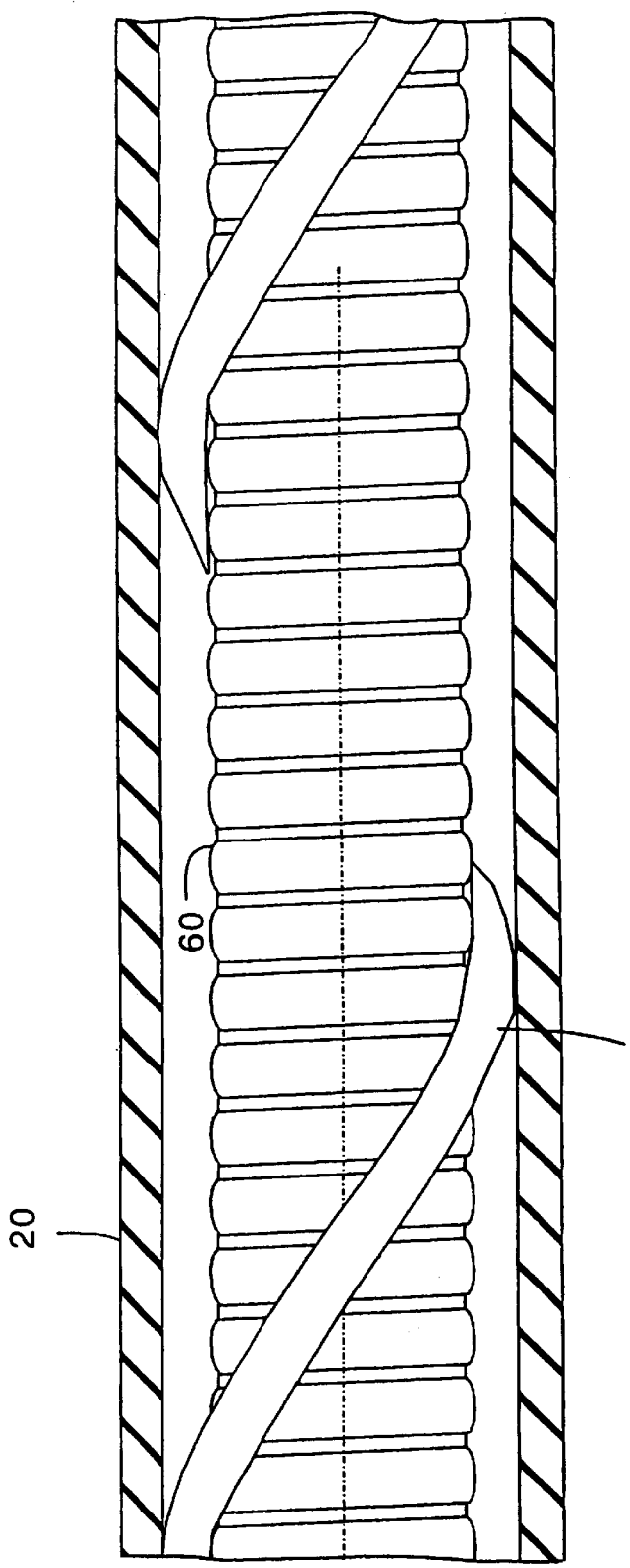
FIG. 11 shows a partly sectional side view of this embodiment after installation.
Figure 11A:
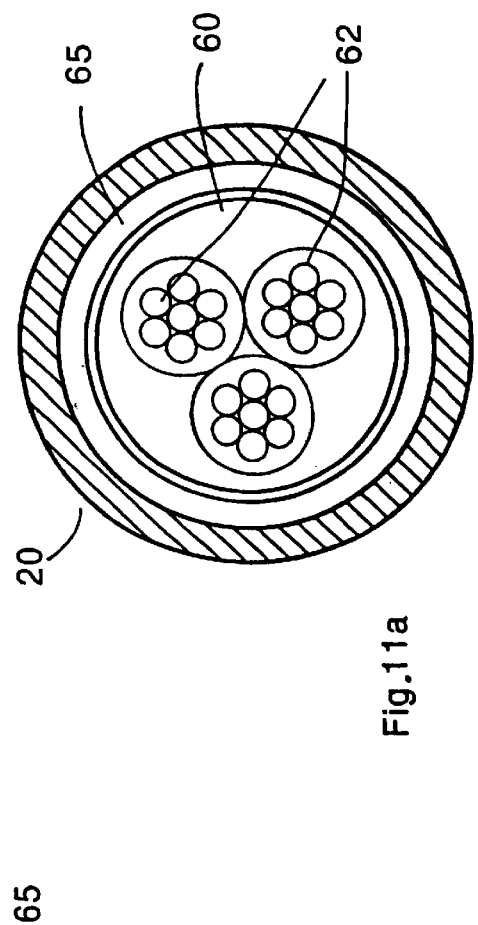
FIG. 11a shows a cross sectional view of this embodiment after installation.

Referring to FIG. 11, high pressure is then applied to the expandable tube 65, causing its diameter to increase so that the power cable 60 and expandable tubing 65 are together snugly fitting inside the coiled tubing 20, and the power cable 60 is thereby secured relative to the coiled tubing. FIG. 11a shows that the tube 65 spans the annular space previously present between the power cable 60 and the coiled tubing 20.

FIG. 12 shows a further modification of a cable and coiled tubing system. Three power cables 70, 71, 72 are wound together, and three expandable tubes 80,81,82 wound around the power cables, so that the power cables are generally protected by the expandable tubes (though the cables and expandable tubing could be plaited in various manners). The largest diameter of this arrangement, while the expandable tubes are in their unexpanded states, is less than the inner bore of the coiled tubing.

High pressure is applied to the inner volume of the expandable tubing, causing the tubes to plastically increase in diameter. The increase in the tubes' diameter is such that the diameter of the cable and tube arrangement, at its widest, is as large as the inner bore of the coiled tubing, and the arrangement of the cables and tubes is secured relative to the coiled tubing. FIGS. 12a to 12c show three cross sections taken along the coiled tubing, illustrating the protective arrangement of the tubing around the power cables. FIG. 12d shows the cables secured after the expandable tubes have been inflated.

Obviously, the number, order and type of cables may be varied according to the requirements of the particular situation, such as which down hole tools are to be used and the method of drilling, and could include cables such as fiber optic cables as well as the power, hydraulic and structural cables shown here. If the power cables were to be made strong enough for instance, structural cables may not be necessary. Hydraulic conduits, made from some tough material such as a suitable composite, also functions as a structural cable.

The expandable tube could be a steel with a high elongation factor, or produced from braided steel hose, or some manner of fiber reinforced hose. The high pressures necessary for the expansion may be provided by any pressurized fluid such as air or nitrogen, but preferably is provided by a liquid such as hydraulic oil is has a low compressibility. The pressurized fluid could also be a settable material such as silicone gel, x-linked gel, cement or the like, so that the diameter of the tube is supported. Ideally, the deformation of the expandable tube is generally plastic, so that the shape is maintained when the pressure is no longer being applied. The expandable tube could thereafter serve as a hydraulic of fluid conduit. The expandable tubes could be swaged in a similar manner to the carrier tube.

The embodiments described here could either be carried out in a dedicated factory, the cooled tubings being transported to the site where it is to be used after the cables have been secured to the coiled tubing, or the coiled tubing, cables, and carrier tube if used, could be arranged at the site itself. The embodiments where the cables are arranged while the coiled tubing is being lowered into the well shaft. Where the cables are to be arranged inside the coiled tubing, this could be carried out while the coiled tubing is fully inside the well shaft. The carrier tube and cables are forced into the coiled tubing, and then, if it is wished to remove the carrier tube, an annular stop similar to the one previously described is placed at the top of the coiled tubing, the carrier tube being withdrawn to leave the cables installed. A standard injector could be used for this, the structural cable shielding the more fragile power cables from damage from the injector.

The expandable tube can simply be a standard hydraulic conduit to which is applied a pressure beyond its yield. The carrier tube may be a small bore length of coiled tubing.

In a modification the structural cable is made from a resilient steel formed into a free standing helical shape, with an outer diameter of the helix when at rest slightly larger than the inner diameter of the coiled tubing. The structural cable is then placed upon the forming tube, upon which it rests loosely. The power cables are then helically wrapped around the forming tube so as to pack tightly with the structural cable. One end of the structural cable is secured while the other is attached to a cord which is threaded through the coiled tubing. The structural cable is put under tension by the cord, this causing the helix's outer diameter to lessen, so that the structural cable grips the forming tube. The structural cable's helical diameter is now reduced sufficiently to allow it to be pushed through the coiled tubing, bringing the forming tube and the other cables with it. When the structural cable is almost fully within the coiled tubing (it will be slightly longer while under tension), the tension is released, causing the structural cable to increase its helix's diameter, so gripping the inner surface of the coiled tubing and relaxing the grip upon the forming tube. The forming tube may now be pulled free, leaving the power cables installed within the coiled tubing.

A structural cable having such spring-like properties can be installed while under tension without a forming tube, however the power cables must in this case be secured to the structural cable.

Alternatively, one or more flexible and resilient cables could be wound upon a resilient polypropylene carrier tube, and the tube put under a sufficient tension that its diameter decreases (its length will of course increase). The carrier tube, and the cables wound upon it, are now introduced into the coiled tubing and pulled through as discussed above. When the tension upon the polypropylene carrier tube is released, the tube returns to its original shape (in the course of an hour or so). As its diameter increases it firmly secures itself and the cable wrapped around it in the coiled tubing.

Figure 13:
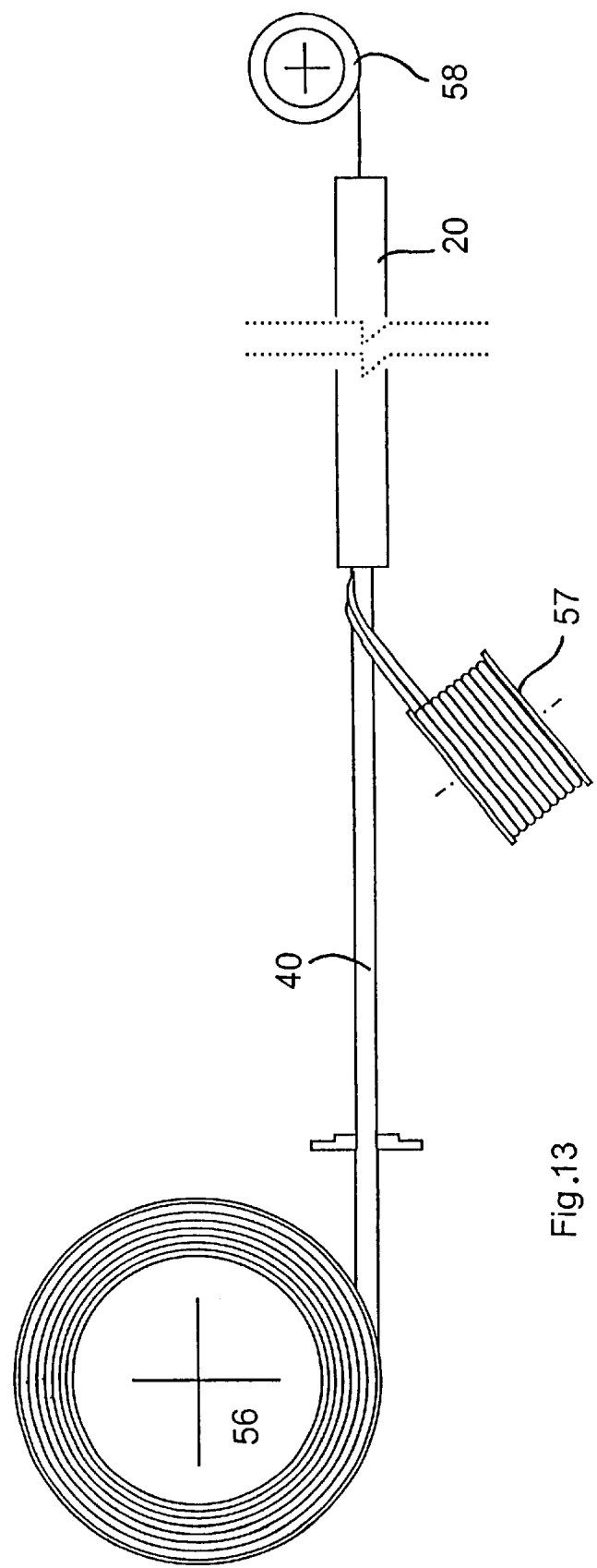
FIG. 13 shows a schematic diagram of production of the system of the invention.

FIG. 13 shows a cable being wrapped around such a deformable carrier tube (though the method may equally be applied to the other types of carrier tube disclosed). The drum 56 upon which the carrier tube is wrapped is held at a constant rotational tension, so that the polypropylene carrier tube is subjected to sufficient tension to cause it to undergo the necessary deformation. A drum 57, upon which a pair of cables are wound, orbits the axis of the carrier tube as the carrier tube is pulled through the coiled tubing. The cables dispensed from the moving drum wind themselves upon the carrier tube. A drum 58 at the opposite end of the coiled tubing pulls the carrier tube through the coiled tubing and maintains it under tension. The length of the coiled tubing into which the carrier tube and conductor are inserted could be several thousand meters.

Figure 14:
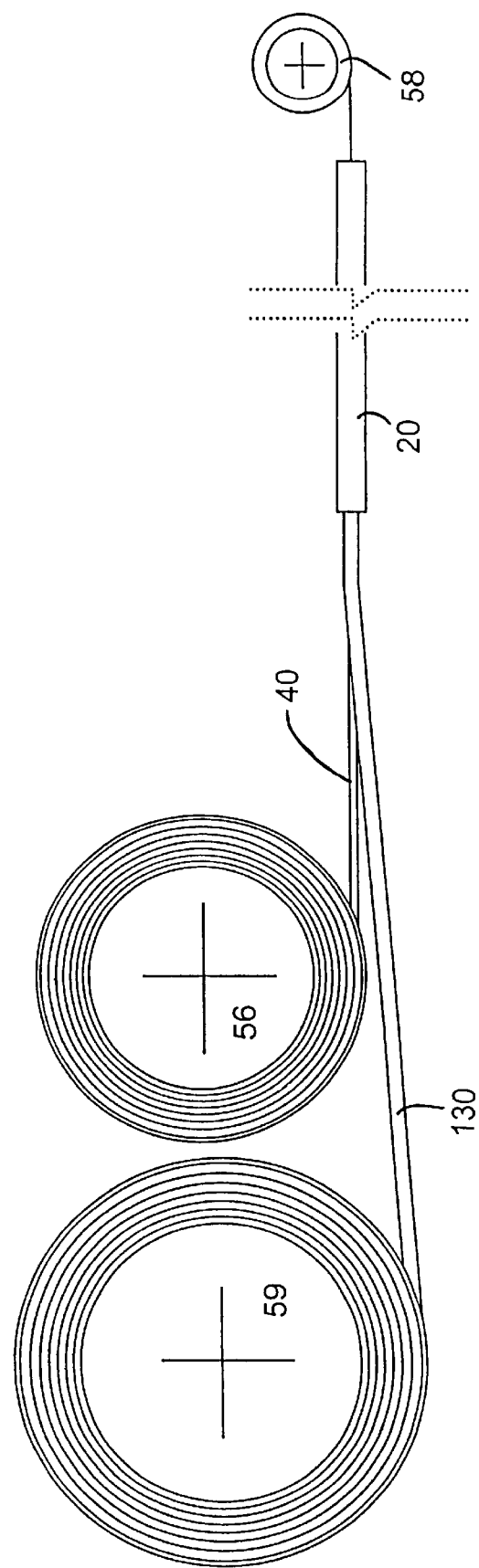
FIG. 14 shows a schematic diagram of another method of production of the system.

Referring to FIG. 14, a strip of material including a conductor may also be formed around a carrier tube in order to be introduced to the coiled tubing. Again, a carrier tube 130 is introduced to a length of coiled tubing 20 and pulled through under the influence of a drum 58 at the opposite end of the coiled tubing. The strip may be formed around and secured to the carrier tube, or it may have been manufactured as a axially split tube with sufficient resilience to return to that shape when the carrier tube is pressed into the split.

Figure 20:
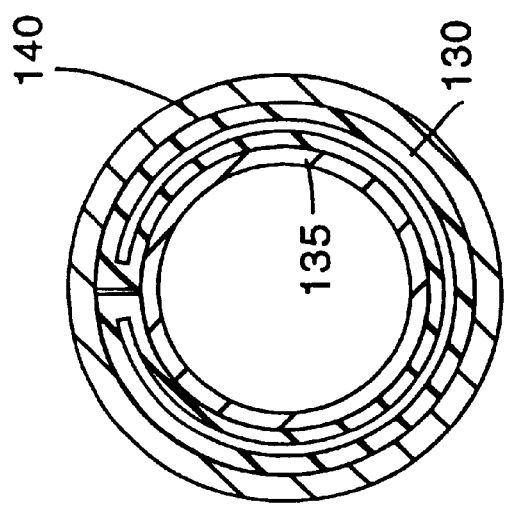
FIGS. 19 and 20 are cross sectional views of the conducting member, the inner coiled tube and the outer coiled tube.

Referring to FIG. 20, an arrangement of such strip of conductor contain material an comprises an inner coiled tube 135, an outer coiled tube 140 coaxial with the inner coiled tube, and a strip of conducting member 130 coaxial with both and occupying the annulus between the inner and outer coiled tubes. The conducting member 130 including a conductor surrounded by an insulating layer. The conducting member forms a generally cylindrical shape when finally installed.

Figure 28:
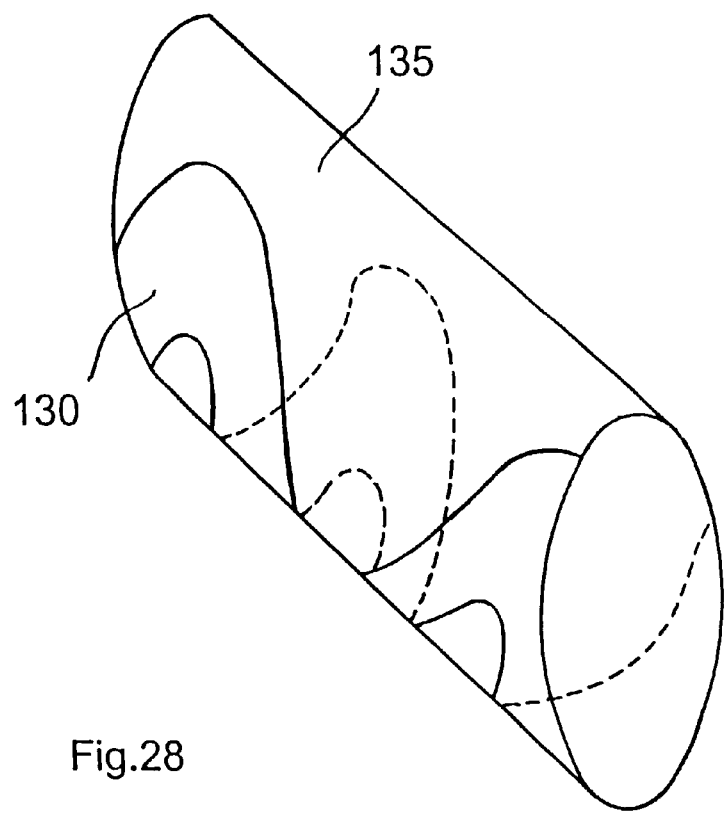
FIG. 28 is a perspective view of a further embodiment of the conducting member.

Referring to FIG. 15, the conducting member 130 (FIG. 28) is formed by unwinding a roll of strip of conductive material such as copper sheet 120, simultaneously with unwinding two strips of insulating material 22,23 so that the conducting material is sandwiched between the two insulating strips. Referring to FIG. 16, the insulating strips 22,23 overlap the conductive strip 120 along both edges, so that the insulating strips may be heat joined. The conducting member may thus be made in very long lengths, using fresh rolls of conductive and insulating materials if required.

Two lengths of coiled tubing are prepared in the usual way, for example, by wrapping over and seam welding a strip of steel, or by butt welding smaller lengths of steel tube. The coiled tubes have different diameters—the outer coiled tube's inner diameter is greater than the outer diameter of the inner coiled tube, so that the inner coiled tube may fit comfortably inside the outer coiled tube. The lengths of the two coiled tubes are the same though, as is the same as the length of the conducting member.

Figure 18:
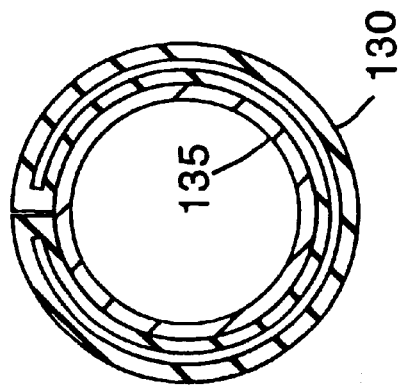
FIG. 18 is a cross sectional view of the conducting member and the inner coiled tube.

The conducting member 130 is folded around the outside of inner coiled tube 135 so that the conducting member assumes a tubular shape as shown in FIG. 18. The conducting member is then secured to the inner coiled tube, for example by the seam being joined, or by straps, a covering sheath, or some adhesive.

Figure 19:
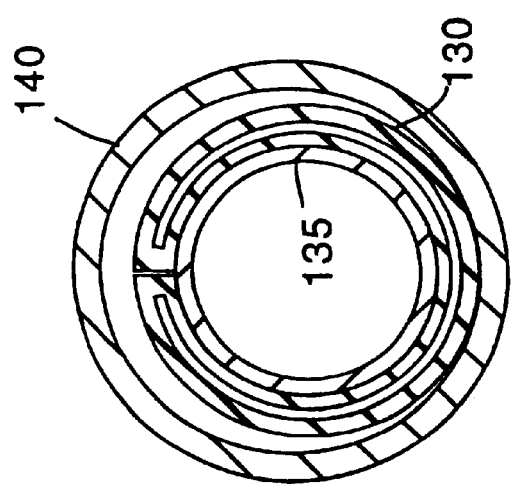

Referring to FIG. 19, the inner coiled tube 135 and the conducting member 130 are introduced to the outer coiled tube 140 and pulled through so that the end of the conducting member, and inner and outer coiled tubes are all aligned.

The diameter of the inner coiled tube 135 is then allowed to relax and expand such that the inner coiled tube and conducting member 130 are held firmly in place against the inner surface of the outer tube as shown in FIG. 20. The expansion may also be effected by running a swaging die through the inner tube, or by applying a high pressure fluid to the inner tube. Alternatively, the diameter of the outer tube 140 could be plastically decreased in order to grip the conducting member and inner coiled tube, for example by crimping.

This conductor, incorporating the two coiled tubes, may now be used in any situation where tubing for allowing fluid flow is required and where it also desired to supply a power or signal line. The conductive material is protected from the outer coiled tubing from mechanical wear as, for example, the coiled tubes are introduced into a borehole, or laid upon the sea bed. It is also convenient to install securely. The inner tube also allows tools to be introduced through it without becoming snagged upon any cabling.

Figure 22:
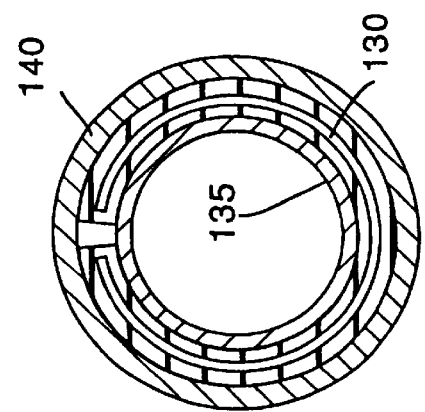
FIG. 22 shows another cross sectional view of the conductor.

Under variations of temperature the different materials, for example, the steel of the coiled tubes, the copper of the conducting material, and the insulating material will expand and contract at different rates. A small gap may be left along the seam of the conducting member (the conducting member being secured to the inner coiled tube in a manner other by seam joining), so that the conducting member will have some room in which to expand into, thus reducing the strain which would be present upon it if it where tightly constrained against the coiled tubes. This is illustrated in FIG. 22.

Returning to FIG. 17, the two strips of insulating material applied above and below the conducting material may be dissimilar, for example one insulating layer 125 could be made of a foam material, so that it has a higher thermal insulation than the other layer 126. The conducting member 130, by virtue of the current flowing through it, could then be used to heat the inner coiled tube, while losing little heat through the outer coiled tube. This would be especially useful when piping viscous oil through low temperature environments.

Figure 23:
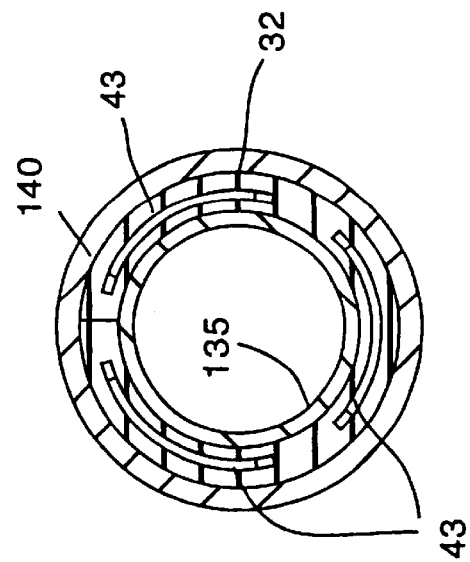
FIGS. 21 and 23 are cross sectional views of further embodiments of the conductor.
Figure 21:
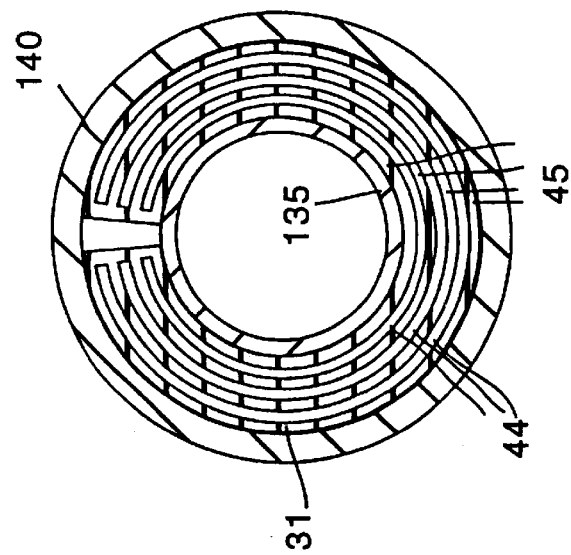

Referring to FIG. 21, the conducting member 31 could be varied, for example by including more conductive portions. Here three conducting strips 44 and four insulating strips 45 in alternating layers make up the conducting member, which is installed between the two coiled tubes 135, 140 in the same way as previously. A three phase power supply may now be carried by the conductor. FIG. 23 shows an alternative arrangement of the conductive portions 43 to support a three phase supply in a conducting member 32. In this embodiment gaps have been left at the between the edges of the conducting material and the insulating material to allow the expansion of the conducting material.

Figure 26:
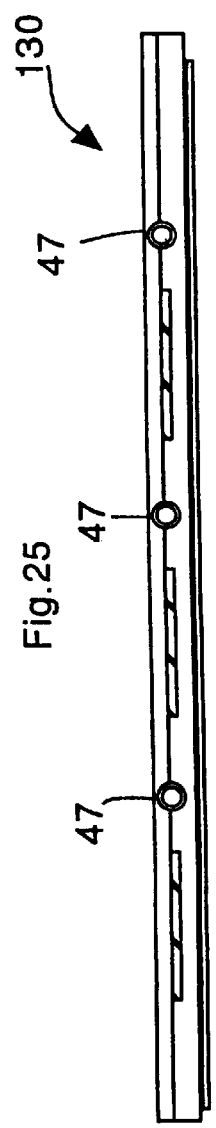
FIG. 26 is a cross sectional view of a further embodiment of the conducting member.

Such a conducting member may be combined with other components, with the necessary adaptations. FIG. 26 shows a conducting member which additionally incorporates channels 47 which contain fiber optic cables or hydraulic lines for example. Numerous variations within the scope of the present invention will present themselves to those skilled in the art.

Figure 24:
FIGS. 24 and 25 are cross sectional and plan views respectively of a further embodiment of the conducting member.
Figure 25:
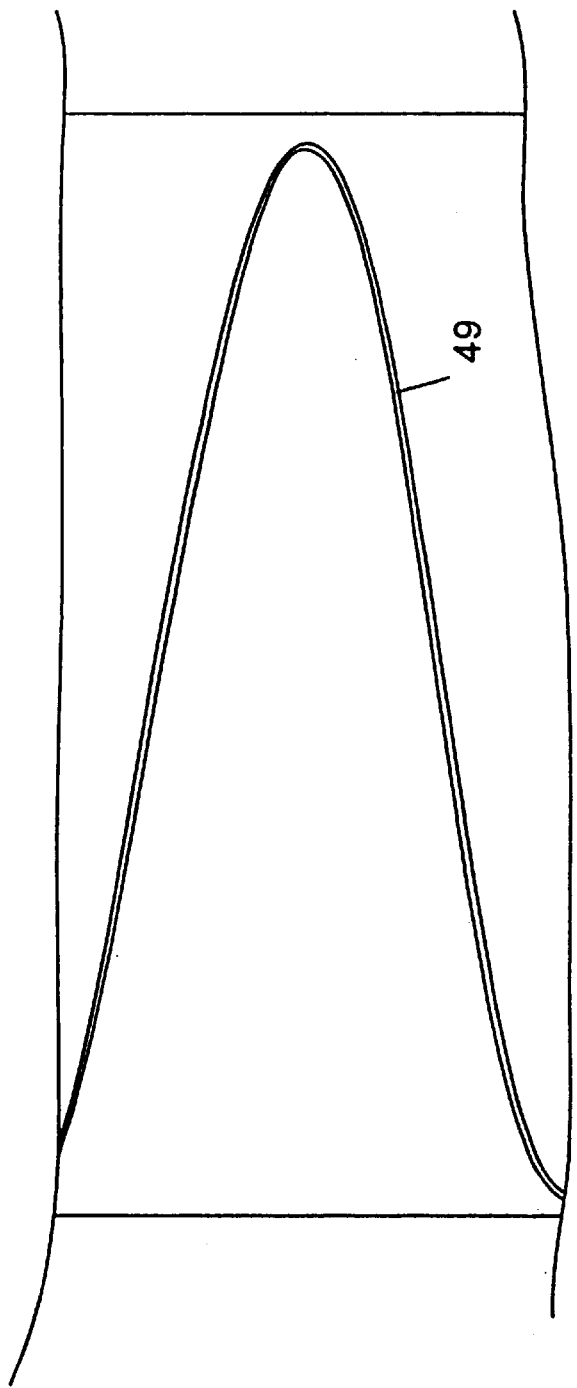

A low friction coating could be applied to the conducting member in order to ease its insertion into the outer coiled tube. Referring to FIGS. 24 and 25, the coating is provided by a cord 49 of low friction material such as nylon or Teflon which is applied to an insulating layer which is to become the outer surface of the conducting member 130. This cord may also act as a stand off to maintain an insulating air gap between the coiled tubing and the conducting member. When the conducting member is wrapped around the inner coiled tube, the low friction cord 49 forms a web which supports the conducting member and the inner coiled tube as they are pulled through the outer coiled tube.

The conducting member could be produced so as to follow a generally sinusoidal or other generally sinuous path, while lying in the plane, rather than extending in a straight fashion. Both the conducting material and the insulating material would follow this shape. When the conducting member 130 is then wrapped around the inner coiled tube 135 prior to introduction into the outer tube, it would form a shape depicted in FIG. 28. Such a shape is easier to apply to around a tube than a helix, and can to some extent be compressed and extended along the axis of the tubes, so that undue strain upon the conducting member is avoided when the coiled tubing is straightened or tightly wound.

Figure 27:
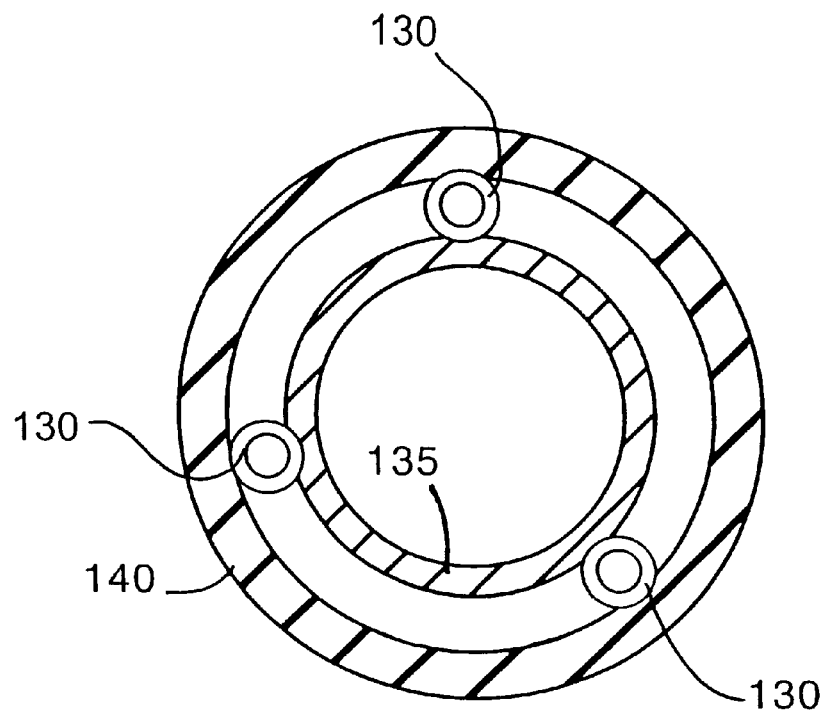
FIG. 27 is a cross sectional view of a further embodiment of the conducting member.

The conducting member could be made up of one or more cable installed between the inner and the outer coiled tubes. This is shown in FIG. 27, with three cables 130 making up the conducting member. The principle may also be applied to separate lengths of tubing fitted together, like drill pipe sections for example.

Obviously the number, order and type of cables may be varied according to the requirements of the particular situation, such as which down hole tools are to be used and the method of drilling, and could include cables such as fiber optic cables as well as the power, hydraulic and structural cables shown here. If the power cables were to be made strong enough for instance, structural cables may not be necessary.

Many of the features here described in different embodiments could be combined in many permutations to make new embodiments, to any type of coiled tubing. Alternative embodiments using the principles disclosed will suggest themselves to those skilled in the art, and it is intended that such alternatives are included within the scope of the invention, the scope of the invention being limited only by the claims.

What is claimed is:

1. A coiled tubing system for subsea and subsurface use including a length of coiled tubing, a cable or conducting member and an inner tube, the inner tube and the cable or conductor member being disposed in the coiled tubing, the coiled tubing and/or the inner tube having been deformed along at least part of their length such that the cable or conducting member is substantially secured between the inner surface of the coiled tubing and the outer surface of the inner tube, the interior of said coiled tubing system forming a conduit for oil and gas fluids.

2. A coiled tubing system according to claim 1 wherein the coiled tubing and the inner tube are coaxial, and the cable or conducting member is disposed in the annulus between the coiled tubing and the inner tube.

3. A coiled tubing system according to claim 1 wherein the deformation is effected by a swaging die being introduced into the inner tube.

4. A coiled tubing system according to claim 1 wherein the deformation is effected by the application of a high pressure fluid, including a high pressure gas.

5. A coiled tubing system according to claim 1 wherein the deformation is effected by crimping the outer surface of the coiled tubing.

6. A coiled tubing system according to claim 1 wherein the deformation is effected by releasing the inner tube from a state of tension such that the diameter of the inner tube increases.

* * * * *